United States Patent
Nair et al.

(10) Patent No.: US 11,650,968 B2
(45) Date of Patent: May 16, 2023

(54) SYSTEMS AND METHODS FOR PREDICTIVE EARLY STOPPING IN NEURAL NETWORK TRAINING

(71) Applicant: Comet ML, Inc., New York, NY (US)

(72) Inventors: Dhruv Nair, New York, NY (US); Gideon Mendels, New York, NY (US); Nimrod Lahav, Hoboken, NJ (US)

(73) Assignee: Comet ML, Inc.

( * ) Notice: Subject to any disclaimer, the term of this patent is extended or adjusted under 35 U.S.C. 154(b) by 683 days.

(21) Appl. No.: 16/707,265

(22) Filed: Dec. 9, 2019

(65) Prior Publication Data

US 2020/0372342 A1 Nov. 26, 2020

Related U.S. Application Data

(60) Provisional application No. 62/852,525, filed on May 24, 2019.

(51) Int. Cl.
*G06F 16/22* (2019.01)
*G06N 3/084* (2023.01)
*G06N 20/20* (2019.01)

(52) U.S. Cl.
CPC ......... *G06F 16/2246* (2019.01); *G06N 3/084* (2013.01); *G06N 20/20* (2019.01)

(58) Field of Classification Search
CPC .... G06F 16/2246; G06N 3/084; G06N 20/20; G06N 5/003
See application file for complete search history.

(56) References Cited

U.S. PATENT DOCUMENTS

| | | | | |
|---|---|---|---|---|
| 11,410,083 | B2* | 8/2022 | Vasudevan | G06K 9/6289 |
| 2016/0132787 | A1* | 5/2016 | Drevo | G06N 20/10 706/12 |
| 2016/0189210 | A1* | 6/2016 | Lacey | G06N 7/005 705/7.31 |
| 2016/0224903 | A1* | 8/2016 | Talathi | G06N 3/0454 |
| 2019/0236487 | A1* | 8/2019 | Huang | G06N 20/00 |
| 2019/0354865 | A1* | 11/2019 | Reisser | G06N 3/0454 |
| 2019/0392311 | A1* | 12/2019 | Liu | G06N 3/082 |
| 2020/0026986 | A1* | 1/2020 | Ha | G06N 3/0454 |
| 2020/0104678 | A1* | 4/2020 | Nixon | G06N 3/0472 |

(Continued)

OTHER PUBLICATIONS

Lutz Prechelt, Automatic early stopping using cross validation: quantifying the criteria, Neural Networks 11 (1998) 761-767 (Year: 1998).*

(Continued)

*Primary Examiner* — Andrae S Allison
(74) *Attorney, Agent, or Firm* — Pearl Cohen Zedek Latzer Baratz LLP

(57) ABSTRACT

Systems and methods may train neural networks (NNs) and determine when to stop training to not waste computing or other resources when improvement is not no longer likely. After training period for a NN, a model trained using training data from other NNs may return a a probability of improvement in the loss of the NN or a probability that the likely best loss of the NN is lower than the best loss of the other NNs for which hyperparameters have been chosen. Training may be stopped if the probability is less than a threshold, or a wait value is greater than a wait threshold.

12 Claims, 8 Drawing Sheets

(56) References Cited

U.S. PATENT DOCUMENTS

2020/0213354 A1* 7/2020 Chakraborty ....... H04L 63/0876
2021/0174246 A1* 6/2021 Triplet ................. G06N 3/082

OTHER PUBLICATIONS

Diaz, Gonzalo I., et al. "An effective algorithm for hyperparameter optimization of neural networks." IBM Journal of Research and Development 61.4/5 (2017): 9-1. (Year: 2017).*

Albon, Neural Network Early Stopping, https://chrisalbon.com/code/deep_learning/keras/neural_network_early_stopping/12-2017 (Year: 2017).*

Jabbar, H., and Rafiqul Zaman Khan. "Methods to avoid over-fitting and under-fitting in supervised machine learning (comparative study)." Computer Science, Communication and Instrumentation Devices 70 (2015). (Year: 2015).*

Baker et al., "Accelerating Neural Architecture Search Using Performance Prediction", arXiv:1705.10823v2 [cs.LG] Nov. 8, 2017.

Swersky et al., "Freeze-Thaw Bayesian Optimization", arXiv:1406.3896v1 [stat.ML] Jun. 16, 2014.

Klein et al., "Learning Curve Prediction with Bayesian Neural Networks", 2016.

Domhan et al., "Speeding up Automatic Hyperparameter Optimization of Deep Neural Networks by Extrapolation of Learning Curves", Twenty-Fourth International Joint Conference on Artificial Intelligence, 2015.

* cited by examiner

SYSTEMS AND METHODS FOR PREDICTIVE EARLY STOPPING IN NEURAL NETWORK TRAINING

RELATED APPLICATION DATA

This application claims benefit from U.S. provisional patent application 62/852,525, filed on May 24, 2019 and entitled "SYSTEM AND METHOD FOR PREDICTIVE EARLY STOPPING IN NEURAL NETWORKS" incorporated herein by reference in its entirety.

FIELD OF THE INVENTION

The present invention relates generally to machine learning; specifically to training neural networks.

BACKGROUND

NNs are computing systems inspired by biological computing systems, but operating using manufactured digital computing technology. NNs are made up of computing units typically called neurons (which are typically artificial or simulated neurons, as opposed to real or biological neurons) communicating with each other via connections, links or edges. In common NN implementations, the signal at the link between artificial neurons may be for example a real number, and the output of each neuron may be computed by function of the (typically weighted) sum of its inputs. NN links or edges typically have a weight that is adjusted as learning proceeds. The weight increases or decreases the strength of the signal at a connection. Typically, NN neurons are divided or arranged into layers, where different layers may perform different kinds of transformations on their inputs and may have different patterns of connections with other layers. NN layers may also be connected by functions which may be adjusted with learning.

Machine learning algorithms, using e.g. neural network (NN) or connectionist systems, are trained or learn by iteratively adjusting model parameters to optimize an objective function, also known as a loss function. The goal of training a model may be to determine a set of hyperparameters, and/or weights of links or functions connecting neurons, and an optimization procedure that minimizes the training loss and allows the model to achieve generalization on unseen data.

Hyperparameters may be parameters that cannot be directly optimized as a function of the model's loss, and may be determined using a part of the data that has not been used for training (e.g. a validation or hold out set). NN hyperparameters may describe an overall architecture of the NN such as number and structure of layers, number of neurons in each layer or overall, the type of functions neurons use when computing output, and variables which determine how the network is trained, such as the learning rate. Hyperparameters may include parameters other than those describing a NN architectures, for example NN training parameters such as batch size, number of training parameters, number of training samples, number of link weights, number of layers, number of examples in a training set, etc. Hyperparameters may include for example, a number of layers, a kernel size for a layer (e.g. 3×3, 7×7), a batch size (e.g. 32, 64, 128 or 256), a learning rate (e.g. 0.0001 to 0.1) or other parameters. Hyperparameters may include layer configuration, activation function, or other data. Other hyperparameters may be used.

A NN may also be described by non-hyperparameter parameters such as weights of links or functions that link layers of a NN, which may be adjusted during learning or training.

Training a model, such as large NN models, is a time-consuming process, with a significant computational overhead. Evaluating different weights, and hyperparameter configurations, involves waiting for the model's loss function to converge to some local minima.

NNs may learn to perform tasks by considering example input data, generally without being programmed with any task-specific rules, being presented with the correct output for the data, and self-correcting. During learning the NN may execute a forward-backward pass where in the forward pass the NN is presented with an input and produces an output, and in the backward pass (backpropagation) the NN is presented with the correct output, generates an error e.g., a loss, and generates update gradients which are used to alter the weights at the links or edges. Different types of NNs may generate different types of outputs (e.g. binary, a numerical range) and different numbers of outputs.

During learning, the NN, or the computing nodes simulating the NN, may be presented with training data. For example, in an image recognition application, a NN may learn to identify images that contain cats by analyzing example images that have been manually labeled as "cat" or "not a cat" and using the results to identify cats in other images. The NN may do this without any prior knowledge about cats, e.g., that they have fur, tails, whiskers and cat-like faces. Instead, during learning the NN automatically generates identifying characteristics from the learning material that it processes.

In practice, a NN, and NN learning, is simulated by one or more computing nodes, such as CPUs, e.g. as embodied in personal computers or graphics processing units (GPUs) such as provided by Nvidia Corporation. One or more computing nodes may simulate a NN using known data structures. During execution or inference, the trained NN may for example recognize or categorize images, perform speech processing, or other tasks. A NN may be simulated as an abstract mathematical object, such as a function. A NN may be translated physically to CPU or GPU as for example a sequence of matrix operations where entries in the matrix represent neurons (e.g. artificial neurons connected by edges or links) and matrix functions represent functions of the NN.

A loss or function may define a deviation from an expected or correct output value for a given input, during learning or training. A loss function for a network may represent the difference or inconsistency between the value or values output from the network, and the correct value/values that should be output given the data input to the NN. A loss function may be, for example, a negative log-likelihood or residual sum of squares, but may be computed in another manner. In NN learning, it is desired to minimize loss, and after receiving a loss the NN representation may be updated my modifying weight values in the network using backpropagation.

Learning or training may be organized in batches and epochs. A batch may be a set of multiple training data presented to a NN which results in a number of outputs. The NN weights may be modified after an entire batch is run. A loss may be generated for each batch. An epoch may be a set of batches representing the entire training set; thus an epoch may represent a number of forward/backward passes, each resulting in weight adjustment. There may be multiple losses per epoch, one for each batch. For example, if there are 1,000 samples of training data, divided into 100 batches of 10 data samples each, the training using all 100 batches may make up one epoch. A NN may be trained in multiple epochs, each epoch using the same training data as the last.

Prior training methods typically stop by periodically testing a NN using a holdout data set not included in training data. Training may be stopped for example when improvement stagnates. Since training is a lengthy process, it is desirable to reduce the time spent training. Training NN often involves a diminishing amount of improvement over time, and it is desirable to determine at what point training can be stopped if an acceptable amount of improvement is achieved, without wasting time on further training due to the law of diminishing returns. It is hard or impossible using prior art methods to predict at any given point in training how much improvement can be achieved by training using further epochs. It would be desirable to determine at what point further improvement beyond a certain amount is not likely, or not worth the extra time and resources for training.

SUMMARY

Systems and methods of the present invention may train one or more neural networks (NNs) and determine when to stop training to not waste computing or other resources when improvement is not no longer likely. Systems and methods may train neural networks (NNs) and determine when to stop training to not waste computing or other resources when improvement is not no longer likely. After training period (e.g. an epoch) for a NN, a model trained using training data from other NNs may return a probability of improvement in the loss of the NN or a probability that the likely best loss of the NN is lower than the best loss of the other NNs for which hyperparameters have been chosen. Training may be stopped if the probability is less than a threshold, or a wait value is greater than a wait threshold.

In one embodiment, in a "global" mode, training or evaluating a neural network (NN) which has a first set of hyperparameters, and where there are other trained NNs each having a set of hyperparameters different from the first set of hyperparameters, may include over a series of NN training periods or epochs, where in each epoch the NN undergoes training and a loss is computed, determining a probability that the likely best loss of the NN is lower than the best loss of the other NNs. The determining may be performed using one or more models (which may include sub-models) that has been trained using training losses of a plurality of NNs other than the NN, with different sets of hyperparameters and numbers of epochs used for training as the NNs the current NN is being compared to for training) having input to it a set of model parameters and data describing training loss of the NN. If the probability is less than a threshold, or a wait value is greater than a wait threshold, training may be stopped. In global mode, the model may predict the probability that the current loss curve will be able to improve beyond the best performing model (e.g. NN with certain hyperparameters) seen so far. In local mode, the model may predict the probability that the NN will improve beyond the current minimum value of the loss curve.

In one embodiment, in a "local" mode, training or evaluating a neural network (NN) may include over a series of NN training epochs, where in each epoch the NN undergoes training and a loss is computed, determining, using a model (or one or more models; models may include sub-models), a probability of improvement in the loss of the NN. The model may have input to it a set of model parameters and data describing training loss of the NN. The model(s) may have been trained using training losses of a plurality of NNs other than the NN. If the probability is less than a threshold, or a wait value is greater than a wait threshold, training may be stopped.

In one embodiment, over a series of NN training epochs, where in each epoch the NN undergoes training and a loss is computed, an expected training loss may be determined, using a set of model parameters, data describing training loss of the NN, and a model that has been trained using training losses of a plurality of NNs other than the NN. If the expected training loss (possibly less or minus a loss threshold) is greater than or equal to an actual training loss, or if a wait value is greater than a wait threshold, training may be stopped; otherwise training may continue.

One embodiment of a predictive early stopping tool may estimate the value of a local minima beforehand, and may terminate the model training once it is achieved. Example results show embodiments may reduce model training time by an average of 20%, with an average error rate of 4%.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
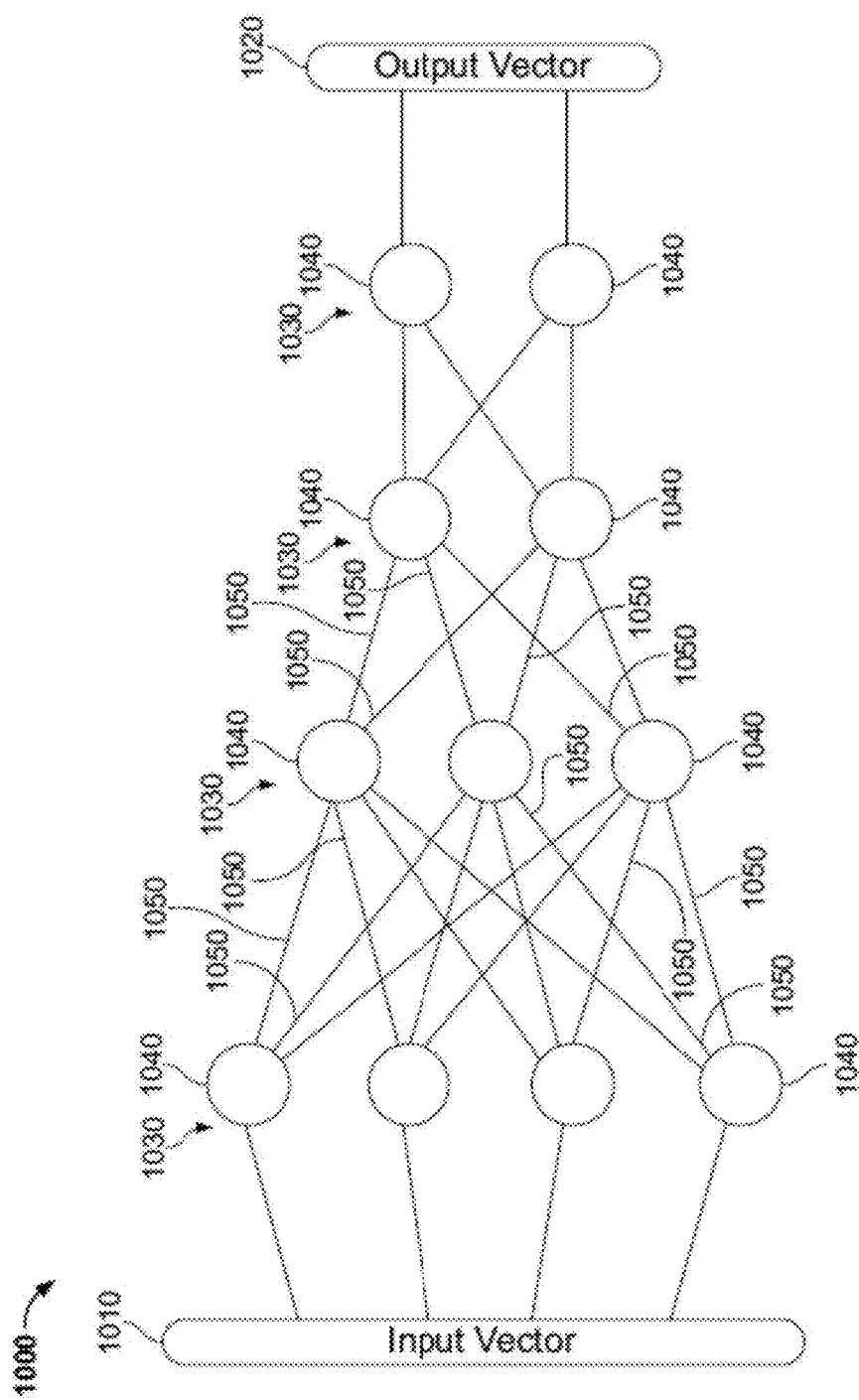
FIG. 1 is a block diagram of a neural network according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention include systems and methods that may stop training of a NN if it is determined that likelihood of improvement in loss over a best loss seen is below a threshold, or the training has proceeded to the mean expected or final value of training (typically after a certain number of initial training cycles or epochs), or if training has "stalled" and does not improve (e.g. over a historic best value) over a certain number of training cycles or epochs. In some embodiments, a training module or unit may call an early stopping module or unit (e.g. as described in the examples in Tables 1-5 herein) and receive instructions to stop training or not stop training.

Embodiments may be used for choosing hyperparameters of a NN. For example, hyperparameters may be chosen for a NN as is known in the art, and the NN may be trained, the training process determining if to stop training the NN if the likelihood of improvement (e.g. to a final loss) of the NN beyond a best loss seen for other NNs with other sets of hyperparameters is less than a threshold. In another embodiment, after hyperparameters for a NN are decided, the NN may be trained by a process which stops training when the likelihood of improvement (e.g. to a final loss) of the NN beyond a best loss seen before for this NN is less than a threshold. Other embodiments may stop training based on a comparison of the current loss for the NN to a predicted best loss (e.g. final best loss) for the NN. In one embodiment, if an expected or predicted training loss (e.g. that returned by a model) is greater than or equal to the actual training loss of the target NN, or if patience has been exhausted (e.g., if a wait value, which is incremented if no improvement is seen, is greater than a wait threshold) training may be stopped.

In some embodiments, one or more models, possibly including sub-models, may be built or trained using training data of many other NNs (e.g. collected in the past, before training the target NN, or before choosing hyperparameters for a set of NNs to be compared), some having different structures and uses than the target NN being trained, and the model may be used to return an expected loss at a certain time or training period for the target NN. The model may take as input data describing the NN being trained such as model parameters (e.g. hyperparameters) and loss data such as a loss history and a current loss (which may be included in the loss history), and return one or more values describing a training loss.

Typically, there is a delay before determining whether or not to stop to prevent stopping from occurring at the very beginning of training in an early training cycle, period or epoch (e.g. the first or second epoch). For example, a process may wait for a certain number of iterations or epochs, e.g. 10 epochs, for a target NN being trained, before making a prediction and determining if training should be stopped. Additionally, the prediction may be adjusted for every new epoch of data received, and thus the mean predicted loss value may rise or fall based on loss values being reported.

Embodiments may incorporate a predictive model into an early stopping algorithm that is responsible for stopping a NN training process at the point at or as soon as the minimum predicted validation loss is achieved. An embodiment may terminate training based on a model, such as a prediction provided by a learning curve model.

The model may be updated using data gained from training the particular or target NN. The comparison of expected and actual loss may be modified by a threshold or range such that if the difference is less than the threshold or within the range it can be deemed that stopping should occur.

Some embodiments may be built on top of a model estimating the minimum value of a validation metric for a given experiment configuration. A large amount of loss function data, or training losses, may be collected, from multiple different NNs (typically different NNs in a variety of different contexts, with a variety of different architectures, performing a variety of different analysis tasks, having been trained for different numbers of epochs), along with hyperparameter and possibly other data, e.g. via an experiment or learning management platform, to build or train a predictive model that can estimate an interval in which an evaluation metric is likely to fall. For example, time series data or training losses from thousands of loss curves, from many different NNs, may be extracted from experiments or training executed using an experiment management platform. In addition to the time series data, derived data or parameters may be extracted for each curve of loss over time, such as slope and rate of change. Some embodiments may, unlike some prior art methods, not partition data based on specific NN architectures. Some embodiments do not need to use information regarding architecture type, or architecture specific parameters, such as the number of convolution filters, to predict the minimum value of the learning curve.

In some embodiments, since the models used have been trained or developed using training losses of multiple NNs, a particular NN when applied to the model to determine stopping gets the benefit of a model trained on data gathered from many NNs including those other than that particular NN being analyzed for stopping.

The model or models may be gradient boosting machines (GBNs). Gradient boosting is a machine learning technique for classification, where a prediction model may be in the form of an ensemble of weak prediction models, typically decision trees including, e.g. leaves which group NNs into groups having parameters falling within ranges of hyperparameters or other descriptive data. Other ways of structuring a model may be used. If the models are trees, in each tree, the NNs may be grouped or organized differently, and thus in each tree a given NN may fall into a different leaf. Typically a tree used for a model is initialized with a fixed leaf structure, each leaf accepting and storing data for a set of NNs having a certain range of parameters. Data describing an NN may be input to a model including a tree structure, a leaf representing or including that NN may be found, and data relevant to the NN (e.g. a mean expected loss, a variance of loss, a range of expected loss, a probability of improvement) may be obtained from the leaf. Typically, the output values for a model are created from the average of the relevant values for the relevant leaf. In one embodiment, a model may include an individual tree including data for each specific epoch or time period; in another embodiment an individual tree may include data for NNs having been trained for different numbers of epochs or time periods, and specific leaves may describe NNs having been trained using different numbers of epochs.

In one embodiment, early stopping may be based on a calculated probability that loss will improve, the probability generated by a model categorizing NNs into leaves or other buckets or sets, based on NN characteristics. In such an embodiment, NNs may be characterized on derivations or features of loss histories, and in some embodiments only two "tree" models need be used, with no separate models based on the epoch. For example, in some embodiments, one model or tree may categorize NNs having been trained with varying numbers of epochs, and a single set or leaf may contain NNs having been trained over different numbers of epochs. In such a model, a single NN may appear in multiple places in the same tree, as its features or characteristics may change over time, for example with additions to its loss history.

In one embodiment, a first model (e.g. $m_\mu$) may return, based on an input of NN characteristics or features (e.g. ux), a mean best (e.g. final) expected loss for that NN; and a second model (e.g. $m_\delta^2$) may return, based on that NN's characteristics or features, the variance around the mean (e.g. an estimate for the uncertainty of the associated mean, e.g. the mean for the NN with those specific characteristics) for the NN having those specific characteristics. Each of the models may return data relevant to the NN, which may be used to compute a probability of improvement. In an early epoch a variance may be high, and that variance may become smaller the more epochs exist. Typically $m_\mu$ and $m_\delta^2$ take as inputs the same characteristics and the variance returned by $m_\delta^2$ may be associated with or correspond to the mean of $m_\mu$. The variance may correspond to the span indicating the best case and worst case for the loss, with the mean at the center, returned by $m_\mu$. One embodiment may estimate the minimum expected convergence value of a loss function, y(t), given a feature set of model hyperparameters, ux, and time series data of the loss curve.

In one embodiment, a model, or one or more separate models, e.g. tree-based regression models, may be trained for every training cycle, period or epoch of time series data in a dataset, such that each leaf in each model typically includes data regarding NNs having been trained on different number of epochs. The models (e.g. $m_\mu$ and $m_\delta^2$) may each be trained using separate or non-overlapping data. For example, the various data points of NNs at various stages of learning (e.g. having different numbers of datapoints in a loss history) may be divided up, and half may be used to train $m_\mu$ and half may be used to train $m_\delta^2$. In one embodiment, a model producing mean expected loss (e.g. $m_\mu$) may first be trained using dataset X (half of the data) and thus may provide an expected convergence value. Then that first model may be used to make predictions about the minimum convergence value on the second half of the dataset, and a model producing variance (e.g. $m_\delta^2$) may be trained and having data input by inputting data Y (the other half of the data) to that first model and comparing actual loss for the specific NNs with the mean from the first model: the resulting variance may be used to train and input data into a second model. The second model (e.g. $m_\delta^2$) may be trained to predict the squared residual (e.g. error or variance) values of the predictions of the first model (e.g. $m_\mu$) using the same features as $m_\mu$. Thus $m_\mu$ may provide an estimate of the mean value convergence, while $m_\delta^2$ may provide an estimate of the variance. This may allow the creation of confidence around predicted values. Thus a combined model used may be:

$$f(x) = \{m_\mu, m_\delta^2\}$$

In another embodiment, three separate models, e.g. tree-based regression models, may be trained for every training cycle, period or epoch of time series data in a dataset. The models may each return (e.g. by finding leaves corresponding to the NN) data relevant to the NN. The first model may provide estimates of the mean or average expected change in the loss curve. The second and third models may use a quantile loss that estimates a lower percentile and an upper percentile, e.g. the 5th and 95th quantile change, in the loss curve. For example, the low model may return a value indicating the loss such that X % (e.g. 5%) of the NNs matching the input (e.g. loss history, hyperparameters) have a loss higher or equal to the value. The high model may return a value indicating the loss such that X % (e.g. 95%) of the NNs matching the input (e.g. loss history, hyperparameters) have a loss higher or equal than the value. This may create, for example, a 90% prediction interval for an estimated loss value.

In one embodiment, a final model may include a set of individual models which may be responsible for predicting the minimum value of convergence based on the current training epoch, such as the following example:

$$f(x) = \{\{m_1^{10}(x^{10}), m_2^{10}(x^{10}), m_3^{10}(x^{10})\}, \ldots, \{m_1^t(x^t), m_2^t(x^t), m_3^t(x^t)\}\}$$

Where $m_1^X$ is a first model, returning an estimated mean, for epoch or other period of time X (and which may be considered to have X sub-models each corresponding to an epoch or other period of time), $m_2^X$ is a second model, returning an upper or high bound for an estimated range (a quantile loss that estimates an upper percentile), for epoch X; and $m_3^X$ is a third model, returning a lower or low bound for an estimated loss (a quantile loss that estimates a lower percentile), for epoch X. In one embodiment, a wait period is applied such that the model is not applied until the X'th (e.g. $10^{th}$) epoch is used, as typically loss will decrease during initial training epochs and premature stopping due to actual loss being greater than estimated loss is not desired during this early period. In such a model each leaf describes NNs having been trained on the same number of epochs.

In one embodiment, a model may include multiple "sub-models": a single model is responsible for returning mean loss data at a certain epoch (where the epoch may be measured by the number of values in a series of loss data); another model is responsible for returning an upper or high limit for a range at that epoch, and a third model is responsible for returning a lower limit for the range at that epoch. In some models, a set of models may each include sub-models, each sub-model corresponding to NNs having been trained over a certain number of epochs or to NNs having a certain numbers of losses in their loss history. In other embodiments, a model may include in the same categories or leaves NNs having different numbers of losses in their loss histories. For a given hyperparameter configuration, the models (e.g. models $m_1$, $m_2$ and $m_3$ in the example above) may be responsible for predicting the minimum value of the loss curve based on, for example, 100 epochs worth of data, or other volumes of data.

Time series features used as input to a model may be loss values or loss functions, or validation loss functions from training or experiments. Typically, loss data or time series data is the loss recorded for the last loss in the last batch in each epoch over a series of epochs, and thus such data is organized by epoch. Typically, one loss is generated per batch, and multiple losses are generated per epoch, one per each batch. E.g., during an epoch, a number of losses may occur, but the one used for input to a model may be the last loss occurring in the epoch. Other of different ways of calculating a series of loss data, and defining which loss values to use, may be used. In some embodiments, learning may not be organized by batch or epoch.

In some embodiments, for any model in the set of models used, responsible for making a prediction based on the nth epoch of data, the raw time series features may be processed.

For example, since different NNs have different formats and ranges of loss values, loss values (e.g. for any n'th epoch slice of data) may be normalized or rescaled, e.g. by applying a log transformation, or to the scale 0-1, or other scales. Typically, multiple loss values for a NN are normalized to one value: if a given NN returns a number of loss values per epoch, the multiple loss values may be converted to a single loss value for use with a model. For example, raw time series features or loss values may be first smoothed, for example by applying a log transformation, followed by a Minmax scaling.

After preprocessing (e.g. normalizing, smoothing, etc.) certain features of the values may be extracted or calculated and used in models to categorize instances of NN behavior, e.g. to categorize NN instances as leaves in a tree model. The features extracted may be used to decide into which leaf or category to place the NN. Extracted time series features may be input along with hyperparameters and graph features to an alignment process. Hyperparameters and other NN characteristics may be extracted from for example a graph representing the NN (a NN may be represented as a graph of nodes connected by links). Extracted timeseries features, hyperparameters (e.g. batch size, learning rate, number of training samples, etc.), and graph (e.g. extracted from the graph representing the NN) or other features such as the number of trainable parameters present in the mode may be analyzed. Example values or features that can be extracted to describe training loss include:

First and second order difference of the normalized or pre-processed time series;

Summary statistics of the first and second order differential features, such as the mean, median, sum, standard deviation, etc.

Autocorrelation coefficients of the raw, untransformed time series data. The mean and standard deviation of this set of data may be used as features. Autocorrelation coefficients of a time series may provide a measure of how strongly a value in the time series correlates to a lagged version of itself. For example, when a lag value of 1 is used, how strongly correlated the time series at t-1 is to the time series at t may be calculated. A lag of 1 will result in a single autocorrelation coefficient. In some embodiments, a lag of, for example, up to 40 may be used, resulting in a maximum of 40 coefficients. The mean and standard deviation of these coefficients may be used as features.

The raw time series features used to create the derived data may be dropped or ignored, or may be set to "not a number", or NAN. Other or different features may be used.

In some NNs, during backpropagation, each neuron computes its own gradient for a link for the neuron, the gradient to be applied to adjust the weight of the link. When discussed herein, a neuron taking action such as transmitting data, computing data, etc., may mean that a processor simulating the neuron performs a computation to simulate such action; e.g. a computing node simulating a number of neurons may perform the actual action that is ascribed to the neuron. Typically parameters such as weights are represented as floating point (e.g. 32 bit) numbers, but may be represented in other ways, such as integers or numbers represented by different numbers of bits.

FIG. 1 is a simplified block diagram of a NN used with an embodiment of the present invention; in typical use thousands of neurons and links are used. NN 1000 may input data as for example an input vector 1010 of values (representing, e.g. a photograph, voice recording, or any sort of data), and may produce an output of signals or values, for example a single value or output vector 1020. NN 1000 may have neurons arranged into layers 1030, each including neurons 1040 connected to other neurons by links or edges 1050. NNs may be used for different tasks. NNs used for classification tasks, e.g. classifying photographs into descriptions of the content, may produce, for each class i, an output $z_i$, sometimes called a logit, which may encode or represent the likelihood that a given example input should be classified to class i. Logits $z_i$, for each class i, (e.g., for image recognition dog, cat, llama, etc.) may be transformed into probabilities $q_i$ by comparing each $z_i$ to the other logits, in for example a softmax layer.

Figure 2:
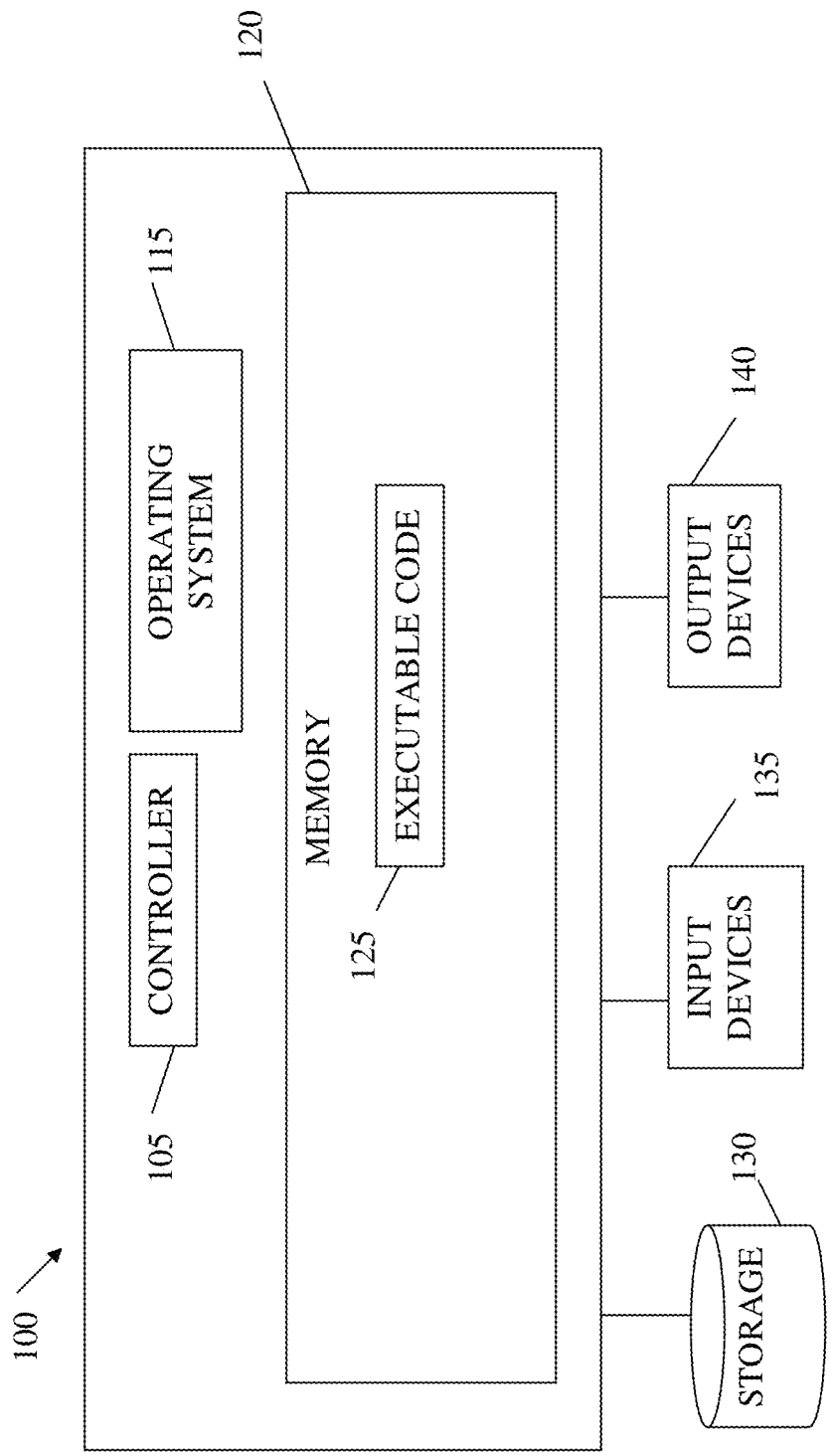
FIG. 2 is a high-level block diagram of an exemplary computing device which may be used with embodiments of the present invention.

FIG. 2 shows a high-level block diagram of an exemplary computing device which may be used with embodiments of the present invention. Computing device 100 may include a controller or processor 105 that may be or include, for example, one or more central processing unit processor(s) (CPU), one or more Graphics Processing Unit(s) (GPU or GPGPU), a chip or any suitable computing or computational device, an operating system 115, a memory 120, a storage 130, input devices 135 and output devices 140. Each of modules and equipment discussed elsewhere (e.g. FIG. 3) such as server 20, model(s) 24, computers 10, NNs 12, training software 14, stopping module 14', and other equipment and modules mentioned herein may be, include, or be executed by a computing device such as included in FIG. 2, although various units among these entities may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may when executed cause NN training, NN data collection, model creation, early stopping of training, coordination of NN training tasks, NN execution or inference, etc. according to embodiments of the present invention. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, early stopping model data, parameters, etc. may be stored in a storage 130 and may be loaded from storage 130 into a memory 120 where it may be processed by controller 105. In some embodiments, some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 3:
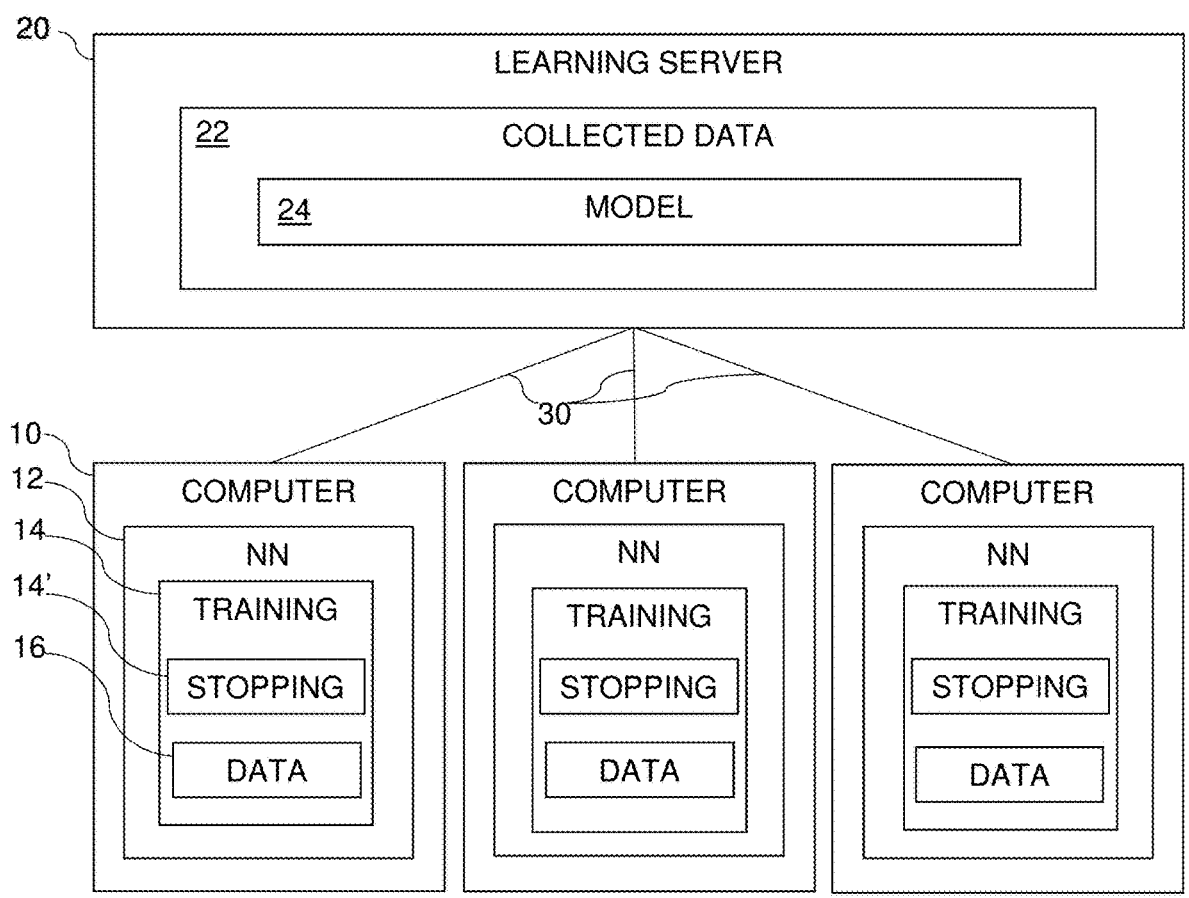
FIG. 3 is a high-level block diagram of an exemplary system which may be used with embodiments of the present invention.

FIG. 3 is a high-level block diagram of an exemplary system which may be used with embodiments of the present invention. Referring to FIG. 3, one or more computer(s) 10 may operate, train, or simulate a NN 12. NN 12 may be represented as data stored on computer 10, e.g. weights, hyperparameters, matrices, etc. NN 12 may be virtual, e.g. having nodes represented by data processed by computer 10. Computer 10 may execute training software 14, including one or more modules or software libraries such as modules or software libraries for controlling or stopping training (e.g. predictive early stopping module 14'), for executing forward and backwards propagation, etc. Predictive early stopping module 14' is in one embodiment a software library included in source code for training software 14. In one arrangement training software 14 may train a NN as is known, and may call predictive early stopping module 14' to determine when to stop training, or to determine whether or not to stop training before training software 14 would otherwise stop training. In one arrangement training software 14 may choose hyperparameters for a NN and test each NN-hyperparameter combination as is known. However, in other embodiments, early stopping functionality, and training, may be performed by different components or modules. While components are shown with respect to one computer 10, such components are note shown for other computers 10 for clarity. Training software 14 may conduct training, during which a NN may be trained using training sets or training data 16, e.g. sample data sets input to a NN during training and used by the NN to alter link weights and produce losses.

Computer 10 may communicate with learning server or computer 20, which may create, update and/or distribute early stopping module 14' or other software. Communication may be via network 30, e.g. the Internet. Computer 20 may communicate with computers 10 to receive from training software 14 training information or data 22, and to process and store data 22 in order to update and/or create stopping module 14'. Computer 20 may distribute stopping module 14' or updates to stopping module 14' to computers 10. While in the example shown updates to stopping module 14' are performed by a computer different from a computer using stopping module 14' for training, in other embodiments a computer conducting training may also update or create a stopping module. Other different configurations are possible: for example a computer 10 controlling training and interfacing with a user may outsource some or all of training (including a stopping module 14') to a remote or cloud computer. While stopping module 14' may when executed by a computer 10 indicate when NN training should stop (e.g. by returning True, indicating stop or False, indicating do not stop; other return values indicating stopping or not stopping may be used), in other embodiments the functionality of stopping module may be performed by computer 20 communicating with a computer 10 conducting training, or the functionality of stopping module may be performed by a different remote, e.g. cloud, computer. Examples of functionality stopping module 14' are shown in Tables 1-5 herein.

Data 22 collected by computer 20 to update stopping module 14' may include for example hyperparameters describing the particular NN and loss data for the NN at the end of each epoch or other period; however other data may be collected. Data 22 may be included (possibly after processing) in models 24 created based on training data collected from training of NNs 12. Models 24 may be for example tree-based regression models. In one embodiment predictive early stopping module 14' may gather data regarding NN learning and transmit the data to learning server 20, so that a model can be updated for use for training other NNs. However, data collection functionality may be performed by different modules.

Figure 4A:
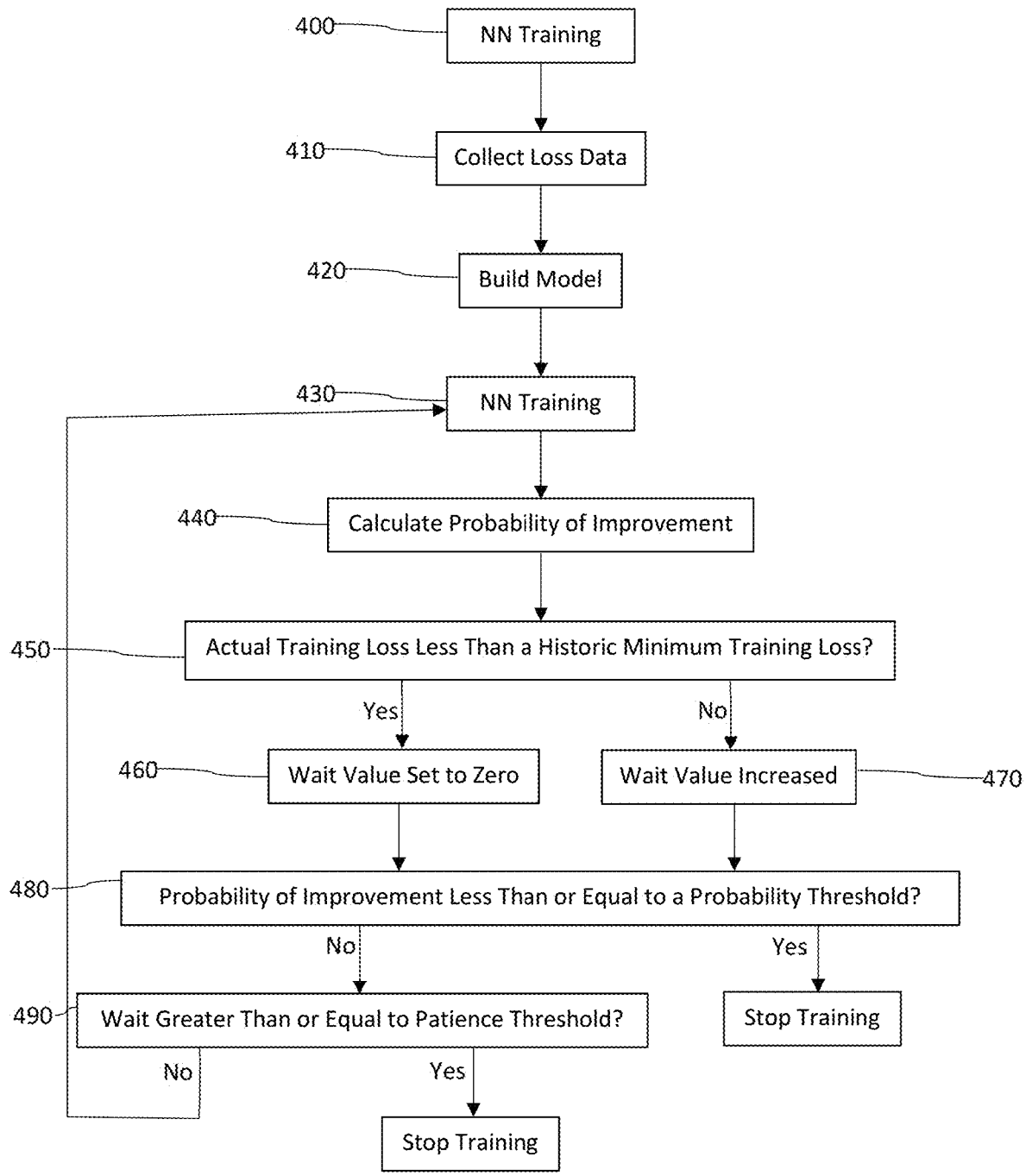
FIG. 4A is a flowchart of a method according to embodiments of the present invention.

FIG. 4A is a flowchart of a method according to embodiments of the present invention. The operations of FIG. 4A may be performed using the systems and modules shown in FIGS. 1-3, but may be performed using other equipment. The example operations of FIG. 4A may be used for early stopping when training a NN whose hyperparameters have been chosen, e.g. a "local" mode.

In operation 400, NN training may be performed on a number of NNs, generating loss data.

In operation 410, the loss data and other data describing the NNs which generated the loss data may be collected. For example loss data such as time series features, loss values or loss functions, or validation loss functions from training or experiments, may be received by a process creating training models for use in a stopping procedure. Such data may be processed or normalized, and first- and second-order features may be generated. For example raw time series features may be smoothed by applying a log transformation, followed by minmax scaling.

In operation 420, one or more models (e.g. models $m_\mu$ and $m_\sigma^2$ as described elsewhere herein, but other models may be used, such as $m_1$, $m_2$ and $m_3$ or other models) may be created or built which may take as input data relating to a particular NN and may output predicted loss data and variance data. The model(s) created may include one or more models trained using training losses of a plurality of NNs including NNs other than a NN which will eventually use (or have used on the NN) the model to determine an efficient time to stop training. (However, training for a target NN may be included in an early stopping model used for that particular NN.) E.g. in some embodiments, training data and results, including data describing a NN, may be collected for many, e.g. thousands of NN during or after training of those NNs, and training a NN may use models created based on these other NNs to determine a best or likely best time to stop training the NN. In one embodiment a model may include tree based regression models. The tree-based models may, when presented with input data such as a particular NN's loss data and hyperparameters, provide estimates of the mean or average expected change in the loss curve, and a variance. In other embodiments, models may return upper and lower bounds of a range, for example quantile losses that estimates a lower percentile and an upper percentile, e.g. the 5th and 95th quantile change, in the loss curve. Other or different models may be used; for example the lower percentile model need not be used.

In operation 430, training may begin or continue (e.g. for a next training interval or epoch) on a NN, e.g. by a system such as shown in FIG. 3, where training data is presented to a NN over epochs. Loss data may be computed and/or returned periodically, for example after each forward and backward pass, or in or after each epoch. In some embodiments, the loss data for a NN being trained using a set of models determining a likely best stopping time may be used to update those same models. Actual loss data may be generated, for example the most recent loss data generated or computed, e.g. the loss data for the most recent or latest training epoch completed, or another measure of actual loss data for the NN for a specific period, not including past or historic loss data.

Typically, the use of an early stopping prediction may be delayed near the beginning of training to prevent early stopping if stopping conditions are met in an early iteration or epoch (e.g. epoch 5). Stopping conditions may include a probability being compared to a threshold, the value of a wait counter, actual loss is less than predicted loss, etc. For example, a process may wait for an initial number of iterations or epochs, e.g. 10 epochs, or another number of epochs or another delay period, for a target NN being trained, before determining if training should be stopped. The epoch number may be inferred, e.g. from the number of items in the ordered series of loss data.

In operation 440, a probability of improvement over a best loss seen for this NN may be calculated. For example, a model may be used to determine a mean expected best loss for the NN, and another model may be used to determine the variance of that mean, and calculations (e.g. as shown in the example in Table 3) may be used to determine the probability.

The probability of a mean or predicted best loss (which may be an average predicted best loss over a set of NNs sharing similar characteristics) improving over a best loss seen so far, e.g. best_metric (which may be the best loss so far for a particular NN, or a group of NNs having hyperparameters chosen), may be calculated by determining the variance for the mean, calculating the square root of the variance, and using a function such as the known cumulative distribution function (CDF) having as inputs the mean, the square root of the variance, and the best loss seen so far. Other methods of calculating the probability of improvement may be used.

For example, an expected training loss may be determining using data such as a set of model parameters, such as hyperparameters for the NN and loss history for the NN, and the current loss for the NN (loss history may in some embodiments include the current loss). A loss history may be a vector or ordered series of losses each recorded at a specific point in time, for example at the end of an epoch. For example, a loss history may be an ordered series $(y_0, y_1, \ldots, y_{t-1})$, where $y_x$ is the loss history at time x, e.g. x being an epoch, or an iteration. In one embodiment $y_x$ is the last loss for the last batch for epoch x, but other methods may be used. The loss history input to the model may be the same format (e.g. same type of time history created, same value range) as the loss history used in the model and collected from other NNs. The current loss may be for example the last loss recorded in the last forward/backward pass. Other NN parameters may be used. Such parameters may be input to the model created in operation 420, e.g. a model which has been built using data (e.g. loss data, hyperparameters) from many other NNs, even NNs with very different structures and functions from the NN currently being evaluated. Typically, loss series data is processed, e.g. normalized where the normalized data has parameters extracted (e.g. derivatives), and this processed data is used by the model as characterizing the NN.

If a model is used having a different model or sub-model for each epoch, a process and model may infer the epoch or time period for the training of the target NN from the number of time series data items, e.g. if there are 10 entries in an ordered series of loss data, it may be inferred there have been 10 epochs of training. Each model progressing along an increasing number of epochs or other periods may use all the information seen so far, e.g. a model for epoch 10 may use 10 epochs of data, while a model for epoch 100 may use 100 epochs of data.

In operation 450, it may be determined if the actual training loss is less than a historic minimum training loss.

In operation 460, if the current or actual training loss is less than a historic minimum training loss the wait value is not increased, and may be reset or set to zero, or to a value indicating waiting should begin at the beginning or for the maximum of the wait period. In some embodiments, an integer wait value is used to determine a period of waiting or "patience" where if no improvement is seen over the period, training is stopped. The period may be measured in training intervals or epochs, rather than absolute time, but in other embodiments other periods may be used. That the current or actual training loss is less than a historic minimum training loss may indicate that a new "high" in training success has been reached, so a "patience" period may be reset.

In operation 470, if the actual training loss is not less than a historic minimum training loss, a wait value may be incremented or increased, e.g. by a convenient integer count value such as 1. Typically, if the loss function of a NN is decreasing it indicates an improvement of the functionality of the NN during training. A historic minimum training loss may be for example the lowest training loss value in the loss history for the NN. A wait value may be for example an integer, initialized to a value such as zero, which is incremented by one. Such an increment or increase may take place if training loss does not improve, for example over a most recent measurement, a determination which may be made if, at a point in time, actual or current training loss is not less than a historic minimum training loss. Another measurement of no improvement may be used.

As with other values, thresholds and comparisons discussed herein, the "or equal" in the "greater than" and "less than" decisions may be swapped: for example in some embodiments if the actual training loss is less than or equal to a historic minimum training loss the wait value is not increased, and if the actual training loss is not less or equal to a historic minimum training loss the wait value is increased.

In operation 480, if the probability of improvement over a best loss seen for this NN is less than or equal to a probability threshold, training may be stopped. If the probability of improvement over a best loss seen for this NN is not less than or equal to a threshold, the process may continue to operation 490.

In operation 490, if the wait value is greater than or equal to a "patience" value or threshold, training may be stopped; and if the wait value is not greater than or equal to a "patience" value or threshold, training may be continued at operation 430. Thus if nether of the "stopping conditions" of operations 480 and 490 are true, training may continue at operation 430. E.g. if the wait value is not greater than or equal to a threshold and if the probability of improvement is not less than or equal to a probability threshold, training may continue at operation 430.

Training may be stopped by a process, such as a predictive early stopping module (e.g. performing operations such as shown in Tables 1-5). Such a process may return a stop/True value or a continue training/False value, or signal training should stop or continue by another process. While in some embodiments a module which determines whether or not to stop training is described as a module separate from a module or system which conducts training (e.g. executes forward/backward passes, adjust weights, etc.) in other embodiments a stopping decision may be made by a training module itself.

Other or different operations may be performed.

Figure 4B:
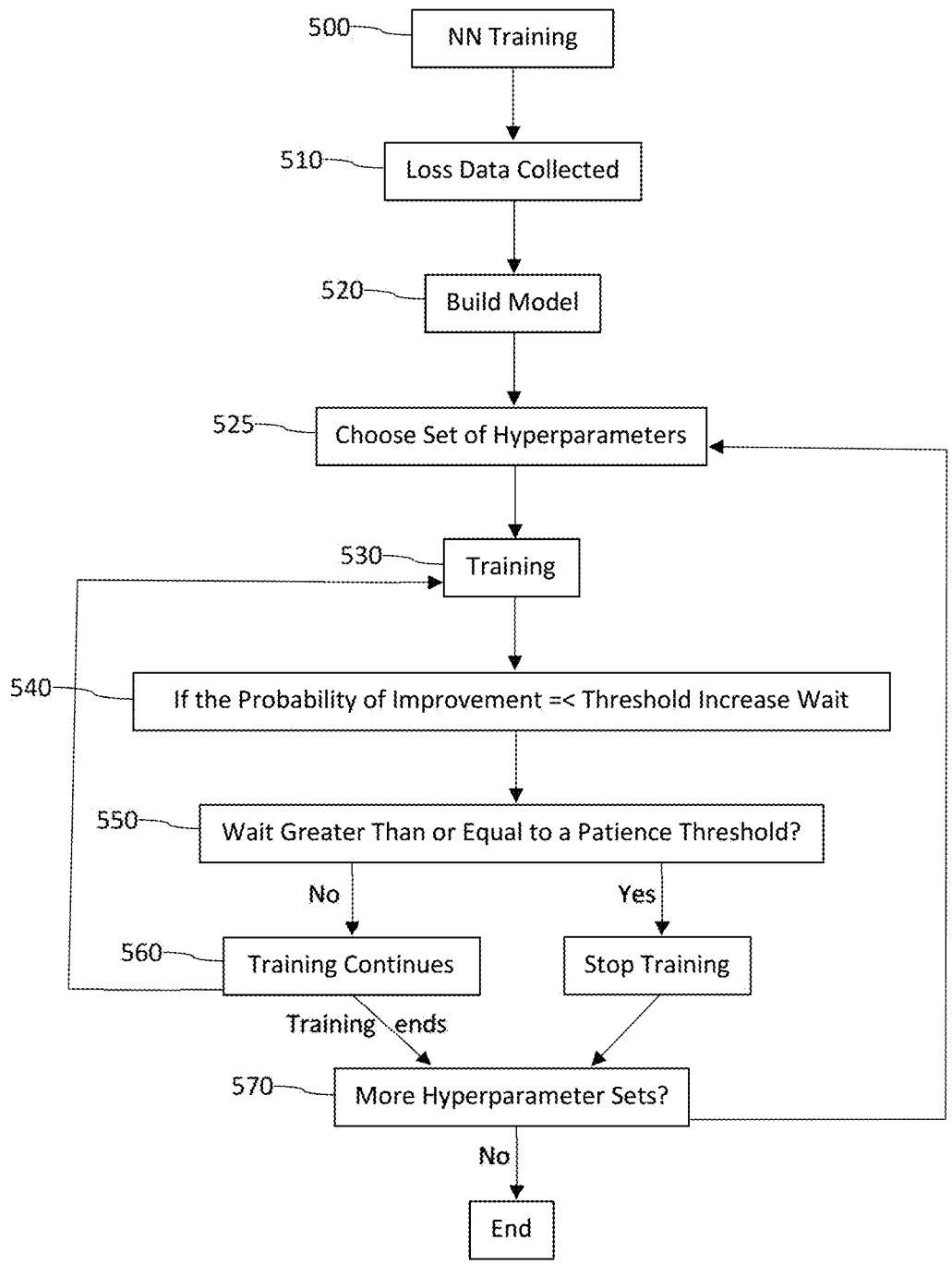
FIG. 4B is a flowchart of a method according to embodiments of the present invention.

FIG. 4B is a flowchart of a method according to embodiments of the present invention. The operations of FIG. 4B may be performed using the systems and modules shown in FIGS. 1-3, but may be performed using other equipment. The example operations of FIG. 4B may be used for early stopping when searching for a set of hyperparameters for a NN. In general, the operations of FIG. 4B may be similar to those in FIG. 4A, but for certain differences described below.

In operation 500, NN training may be performed on a number of NNs, generating loss data.

In operation 510, the loss data and other data describing the NNs which generated the loss data may be collected and used in operation 520 to create models.

In operation 525, a set of hyperparameters may be chosen for a NN using known methods, e.g. traversing or randomly choosing an entry in a grid, each grid entry including a set of hyperparameters.

In operation 530, training may begin or continue (e.g. for a next training interval or epoch) on a NN having hyperparameters chosen in operation 525. The use of an early stopping prediction may be delayed near the beginning of training. The training of a specific NN having a specific or unique set of hyperparameters chosen in operation 525 may be called an "experiment", and a number of experiments may take place. The resulting best loss for each NN in an experiment may be recorded. In another embodiment one best loss value over all different NN-hyperparameter combinations seen thus far may be recorded (e.g. as best_metric); when a new best loss occurs, it may replace the best loss value.

In operation 540, if the probability of improvement over a best loss seen for other NNs is less than or equal to a probability threshold, a wait value may be increased. Such an increase is typically by an integer value of 1.

In operation 550, if a wait value is greater than or equal to a patience value or threshold, then training this particular NN may be stopped (in one embodiment this is effected by a function returning "true"), and the process may proceed to operation 570.

In operation 560, training may continue on the same, current, NN (in one embodiment this is effected by a function returning "false"). If the training for this NN has completed (e.g. because of a "local" early stopping determination such as that made by a process such as in FIG. 4A, or another determination or measure), the process may continue to operation 570; otherwise the process may continue training this NN by continuing to operation 530.

In operation 570, if there are more hyperparameter sets to consider, or that a process is set to consider, a process may continue at operation 525 for a new NN; otherwise the process may stop. In some embodiments, a certain number of hyperparameters may be set as a limit to test; in other embodiments other measures of "more hyperparameter sets to consider" may be used. In some embodiments not all hyperparameter sets are considered.

Other or different operations may be performed.

The expected training loss may take multiple forms. For example, a mean or average expected change in the loss curve for other NNs fitting the same category or description (e.g. categorized in the same leaf on a tree-based regression model) may be or be part of an expected training loss. One tree model that may be used is the Light GBM model, a gradient boosting framework that uses a tree based learning algorithm. Thus determining using parameters training loss an expected loss may include obtaining from a leaf of at least one tree data structure the expected training loss. Expected loss may also include a range of possible losses or a minimum and/or a maximum loss for a certain percentage of other NNs fitting the same category or description, for example a lower percentile and an upper percentile, e.g. the 5th and 95th quantile change, in the loss curve. In one embodiment such a range is determined from two different models, each providing an endpoint for the range. Determining an expected training loss may include determining the minimum of: a mean expected training loss (possibly less the loss threshold as one manner of adjustment); and an estimate of a training loss occurring in a certain percentile of the set of cases. For example, the returned value may be the lower of a mean expected loss, and a maximum of a range, e.g. the loss where 95% of the NNs in the model matching the input to the model (e.g. in the leaf of the target NN or having hyperparameters similar to the target NN) have a loss greater than or equal to the actual current loss.

Figure 5A:
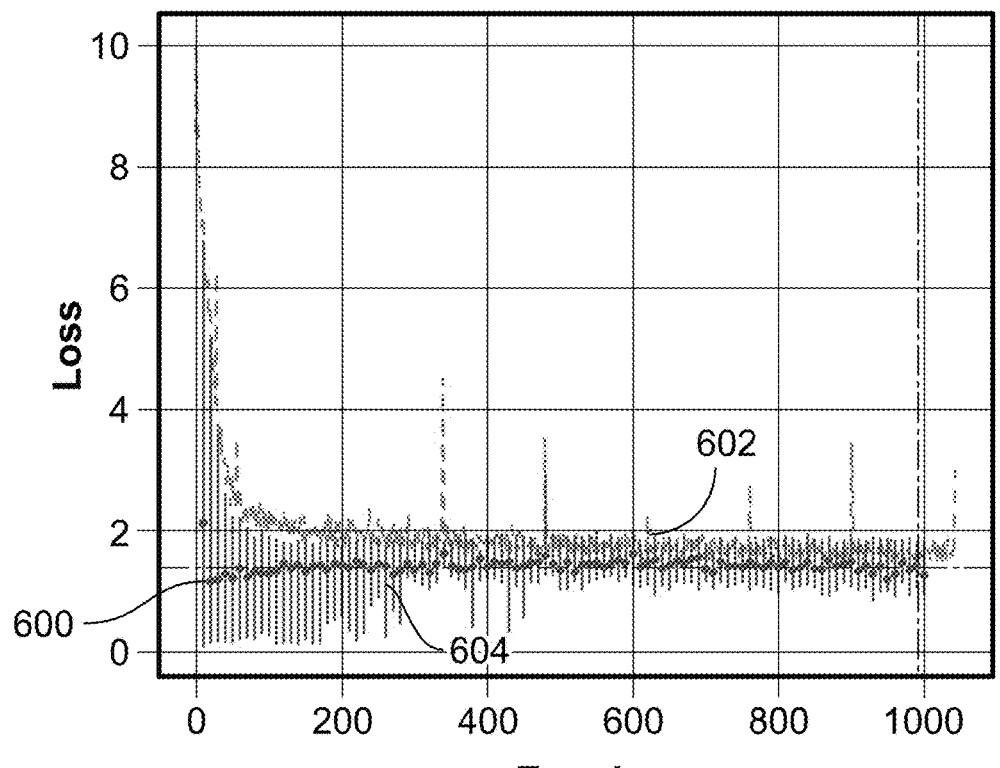
FIGS. 5A and 5B depict example prediction loss curves, according to one embodiment of the invention.
Figure 5B:
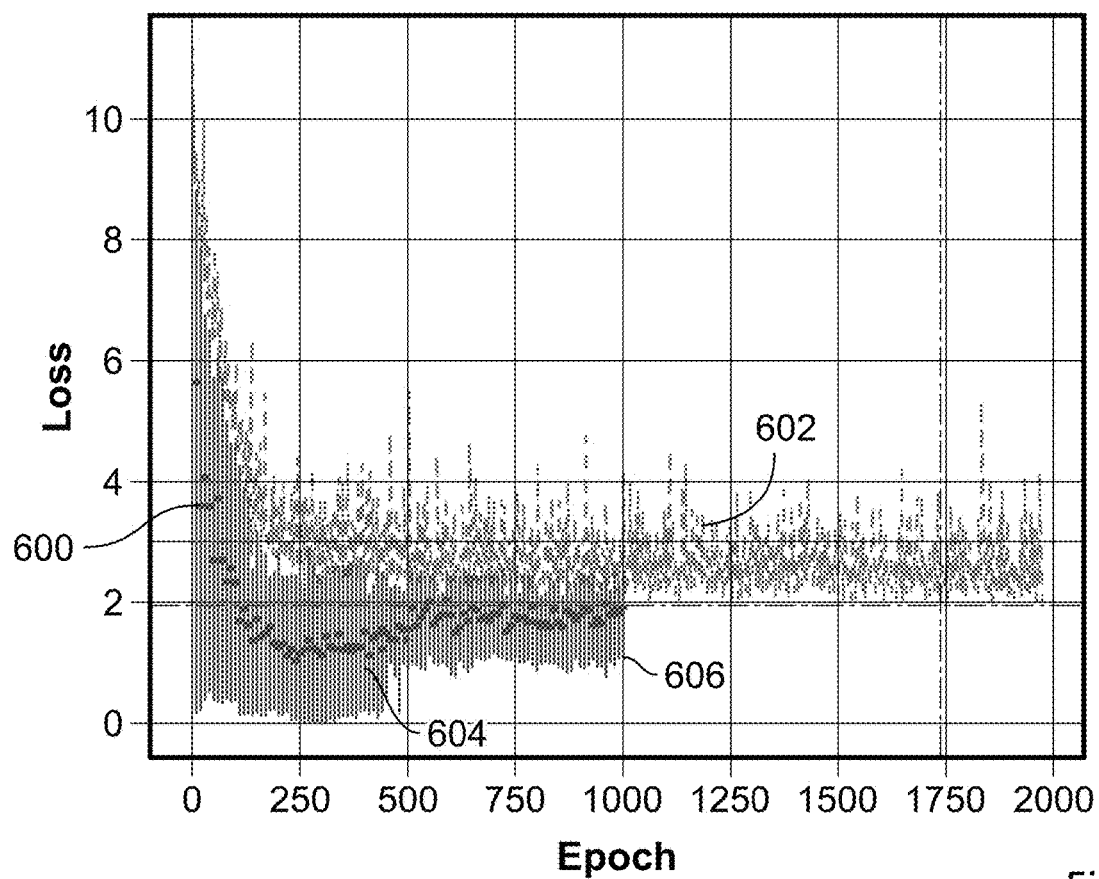

FIGS. 5A and 5B depict example prediction loss curves, according to one embodiment of the invention. Each of FIGS. 5A and 5B depict a set of predictions made by an example set of models for a different set of NN instances. As can be seen in FIG. 5, embodiments may accurately estimate the minimum convergence values for the validation loss hundreds of training cycles, periods or epochs in advance of when a minimum actually occurs. In FIG. 5, dots 600 depict a predicted final loss (not loss at the epoch shown in the X axis), for a specific category of instances of NN described by certain hyperparameters (typically a range of hyperparameters) and loss history (typically a range of loss history data) over a series of epochs, shown in the X-axis. The predicted loss may be a mean of loss for all NNs within a certain category of instances, possibly normalized when displayed in FIG. 5 to the range of loss values of the NN whose actual loss over epochs is shown in orange lines 602. The loss data for each NN in a leaf is typically stored as normalized data, is typically unitless, and may be converted back to a range appropriate for the particular NN being analyzed, for example by the model returning the loss. The representation or data for each leaf in a model may include loss value(s) normalized to a standard range, e.g. 0-1 or another range, and this may be converted back to a range appropriate for the particular NN being analyzed. The Y axis indicates loss over epochs shown in the X axis. The lower bound of blue lines 604 for each epoch shows the lower (e.g. $5^{th}$) percentile change, or lower percentile loss, where below this level 5% of instances NNs have losses. The upper bound of lines 604 for each epoch shows the upper (e.g. $95^{th}$) percentile change, or upper percentile loss. It can be seen that actual loss 602 for a NN converges with predicted final loss 600 as the number of epochs increase. In FIG. 5B, a stopping algorithm according to embodiments of the present invention has been applied at point 606, to prevent future training where it is predicted that no or insignificant loss improvement will take place.

Figure 6A:
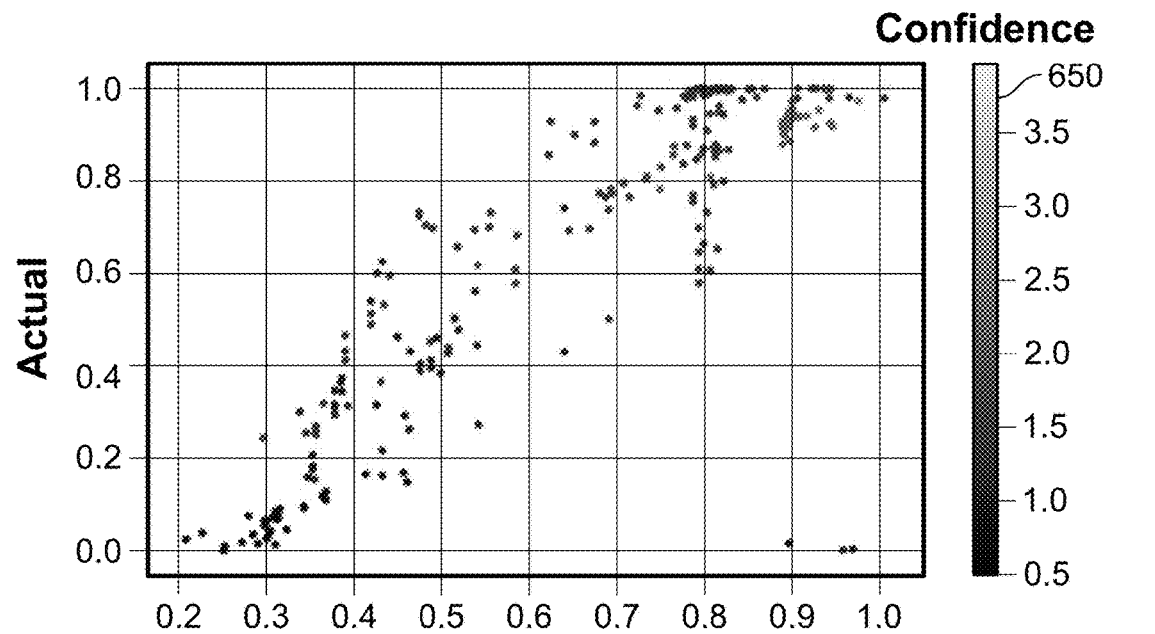
FIGS. 6A and 6B depict actual changes in loss values compared with predicted changes in the loss curves, according to one embodiment of the invention.
Figure 6B:
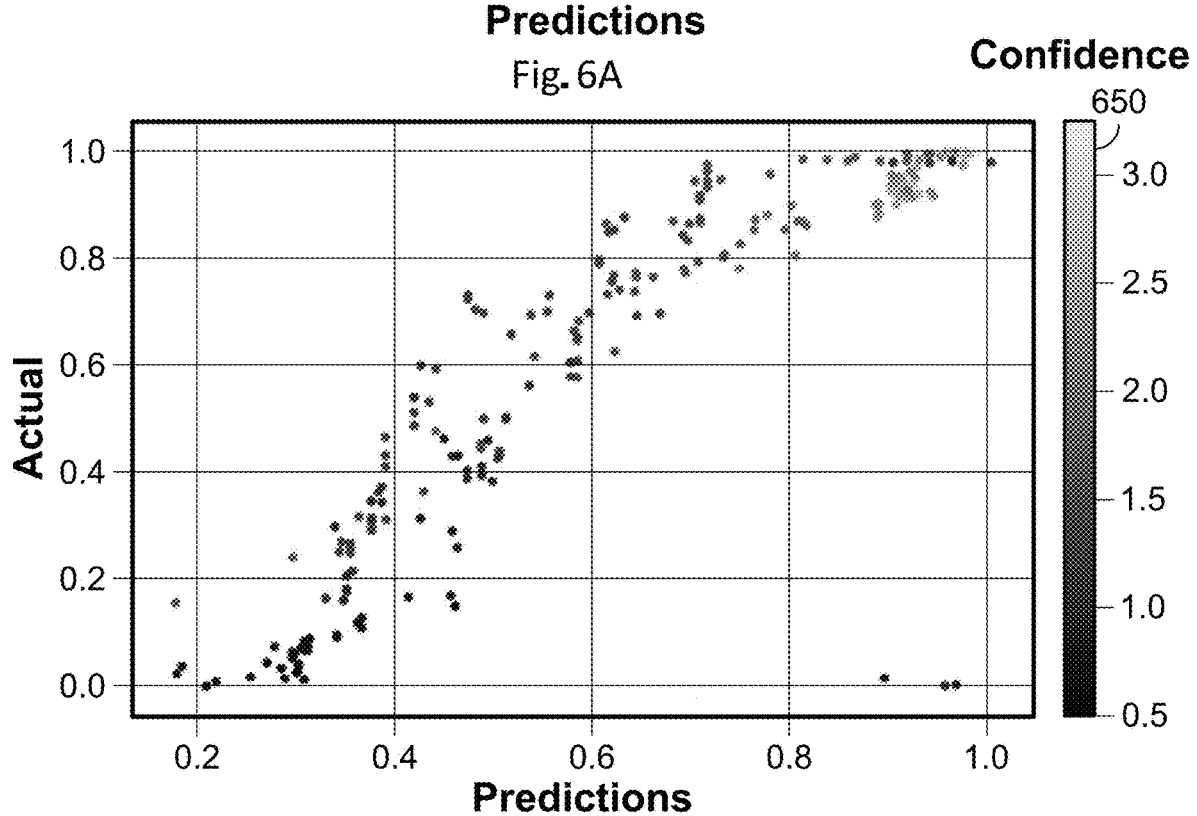

FIGS. 6A and 6B depict actual changes in loss values compared with predicted changes in the loss curves, according to one embodiment of the invention. FIG. 6A shows the comparison at epoch 100, for a sample set of data, and FIG. 6B shows the comparison at epoch 500. The Y axis represents actual loss data, and the X axis represents predicted loss. As can be seen, the example model used tends to make better predictions at epoch 500 because more of the learning curve has been used as inputs. Color key 650 shows a likelihood score representing prediction confidence for each entry in the graph, where a higher number is a higher confidence regarding a prediction.

In FIGS. 5 and 6 it can be seen that some embodiments may accurately estimate the minimum convergence values for the validation loss hundreds of epochs in advance in some cases.

Parameters or settings to control early stopping may be predefined or provided by a user. A probability threshold and a patience or wait threshold, as used in Tables 1-5 herein, may be received or predefined. A threshold such as an accuracy threshold may be predefined or received from a user, which may define or determine how close an actual current training result (e.g. loss) needs to be to the predicted target we to stop learning. Threshold may be expressed for example as a percentage, but other ways of expressing a threshold may be used. For example a threshold may be within a range of 0-1.0, such that if the threshold value is 0.01, a training process will be stopped if the actual or current NN loss value is within 1% of the anticipated change.

Figure 7A:
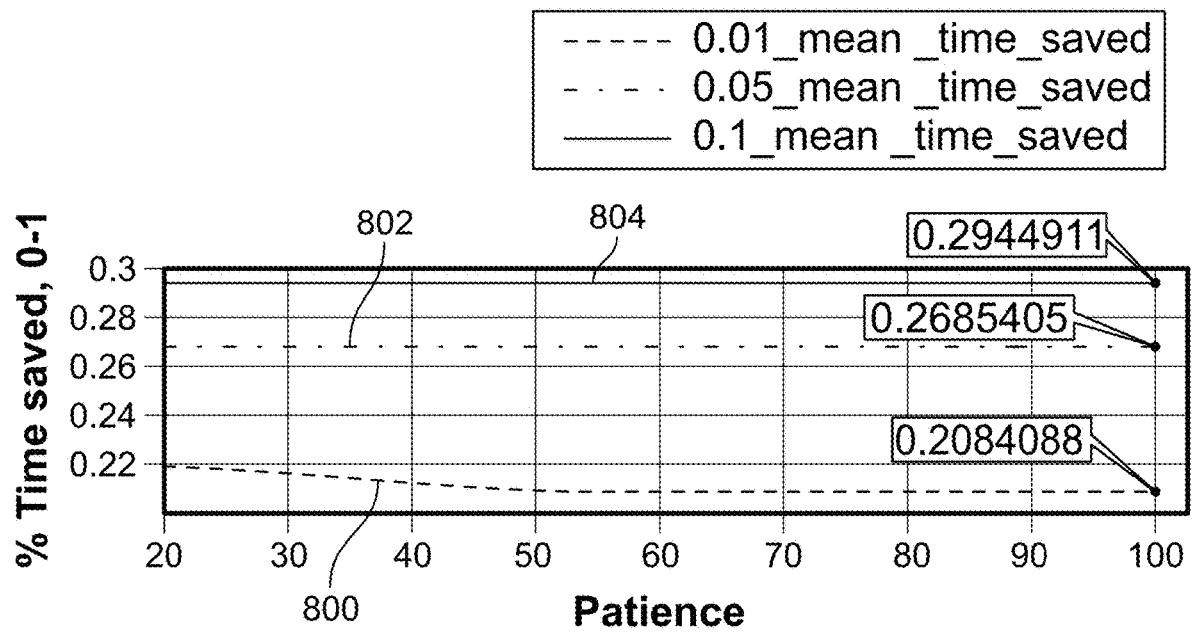
FIGS. 7A and 7B depict example early stopping results, according to one embodiment of the invention.
Figure 7B:
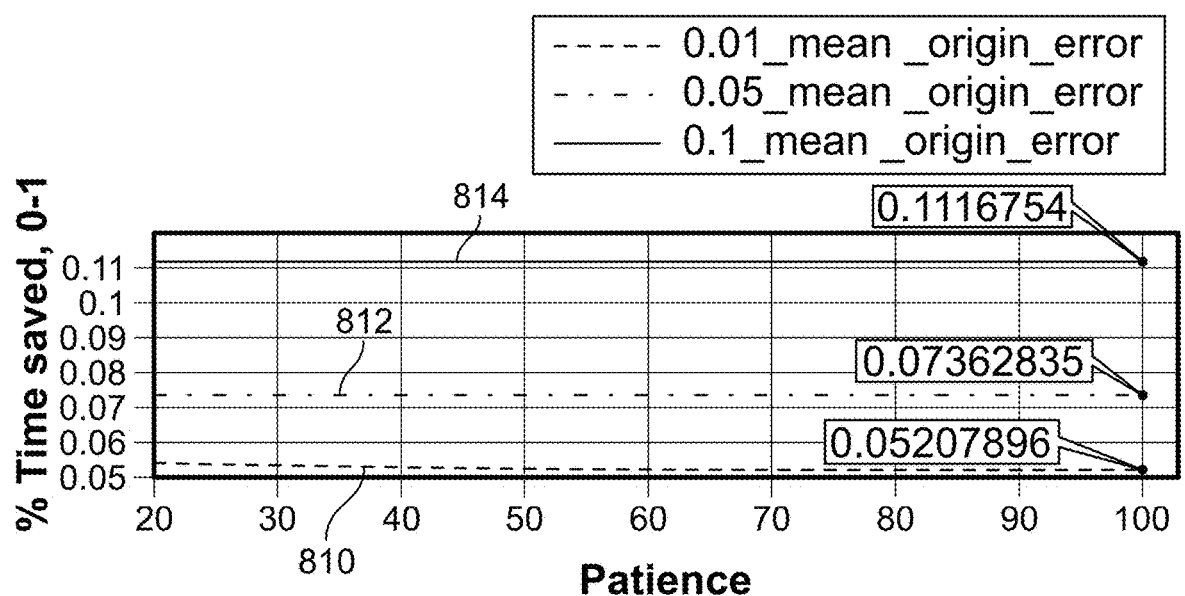

FIGS. 7A and 7B depict example early stopping results, according to one embodiment of the invention with a particular example set of input data. A test was conducted for an example embodiment stopping algorithm by first training a set of models to a desired loss value using conventional stopping mechanisms—e.g. stopping when loss reaches a plateau. These models were then used with different parameters for a stopping process. Time saved was measured as the difference between the time taken to run the algorithm (and train each NN) to the desired validation loss without the use of any stopping, and the time taken to get to within a threshold value of the predicted validation loss while training the NNs, using an embodiment of the present invention. Error is measured as the difference between the predicted change in the loss value, and the actual change in the loss value. If the embodiment works well, the error may be approximately the same as the threshold value parameter.

The graph in FIG. 7A shows the results of early stopping algorithm with various threshold and patience parameter values. In FIG. 7A the Y axis shows the time saved (the final values shown in boxes 806 being for patience value 100) by certain stopping policy (e.g. a set of input control values such as patience and accuracy threshold) in percentage terms (where percentage is converted to a 0-1 scale; 0.2 means 20% reduction in training time). The X axis is the value of a patience input control parameter. Line 800, shown in orange, shows time saved for an input accuracy threshold value of 0.01, line 802, shown in blue, shows time saved for an input accuracy threshold value of 0.05, and line 804, shown in green, shows time saved for an input accuracy threshold value of 0.1. An accuracy threshold may be expressed in a percentage such that a value of 0.01 means 1%.

The graph in FIG. 7B shows the results of early stopping algorithm with various threshold and patience values. In FIG. 7B the Y axis is the difference or error between the change in loss achieved during full training (e.g. without early stopping, rather when training algorithm stops naturally according to prior art methods) and the change in loss at the predicted stop point. In FIG. 7B, if the actual change to minimum using prior art methods was 97% and an early stopping algorithm stopped training at 96%, the error will be 1% or 0.01. The X axis is the value of the patience input control parameter. Line 810 (orange) shows the error or difference input accuracy threshold value of 0.01, line 812 (blue) shows error or difference for an input accuracy threshold value of 0.05, and line 814 (green) shows error or difference for an input accuracy threshold value of 0.1. FIG. 7B shows that using one embodiment, error may follow the threshold value quite closely.

For example, at a threshold value of 0.01, and patience value of 100, an embodiment can reduce training time by an average of 20% with a 4% error.

Embodiments may provide early stopping in a "global" mode to choose hyperparameters for a NN, and/or in a "local" mode with a single experiment, e.g. when hyperparameters have been chosen and training of a specific model is taking place. An embodiment may cause stopping of training in a "global" mode as soon as a probability that the likely best loss of the NN is lower than the best loss of other NNs which have been trained with other hyperparameters is lower than a threshold, or when a wait or patience value exceeds a threshold. Thus the operations shown in FIG. 4A in one embodiment may cause early stopping of NN training for a NN of a known configuration, and the embodiment shown in FIG. 4B may allow choosing among the best NN structure. For example, a number of different NN structures (e.g. having different number of neurons, different layers, different types of layers, etc.) may be trained, and early stopping may be applied to NNs that do not show improvement after a configurable amount of time. Training then may take place on a chosen NN configuration, with or without early stopping.

In a global mode hyperparameters for a NN may be chosen as known in the art, e.g. using a grid where each cell indicates a set of hyperparameters and choosing cells (e.g. sets of hyperparameters) randomly or in an ordered manner. For each NN with a set of hyperparameters, training may take place, and an early stopping method may be applied which may stop training if it is predicted, or it is likely, that the best loss achievable for the current NN is not better (e.g. less than) the best loss achievable for the NNs already trained (with other hyperparameters). Thus training a NN with "worse" hyperparameters may be avoided. A "sweep", "start" or delay variable may cause the early stopping algorithm to not be used or to not cause early stopping before a certain number of experiments on NNs with various hyperparameters to be completed, e.g. the number of initial experiments to wait to complete in a hyperparameter sweep, before starting to make predictions.

An embodiment may cause stopping of training in a "local" mode as soon as a probability of improvement in the loss of the NN is less than a threshold, or a wait value is greater than a wait threshold. An alternate embodiment may cause stopping of training as soon as a minimum predicted validation loss is achieved (possibly within some tolerance or accuracy) or when a wait or patience value exceeds a threshold.

Two types of stopping rules may be used (e.g. the global and local embodiments as described), and input or received parameters (e.g. user parameters) may specify which rule to use.

One embodiment can be expressed as using a combination of modules or algorithms, described below in pseudocode. Table 1 shows an example algorithm for causing early stopping during training of a NN in a "local" mode: e.g. early stopping for a NN whose hyperparameters have been chosen. Table 2 shows an example algorithm for early stopping in a "global" mode, e.g. to determine if to stop training if the probability of loss improvement when compared with other NNs with different hyperparameters is less than a threshold. Example procedures in Tables 1 and 2 may be called by a NN training or hyperparameter determination process to determine when to stop training a particular NN. Table 3 shows an example algorithm for generating a probability that the best or ultimate loss for a NN will be less than a "best metric", e.g. the best actual loss seen when using the NN in local mode or the best actual loss seen when using another NN with other hyperparameters in global mode. The example procedure in Table 3 may be called by the example procedures in Tables 1 and 2. Other algorithms of code may be used, and while the various Tables show functionality split into different parts or algorithms, in other embodiments functionality may be combined in one unit or organized in different units.

As can be seen in Table 3, to calculate a probability in one embodiment, it is assumed that the distribution around the predicted value is normal or Gaussian. A sample minimum value may be compared to this to obtain the probability that a better minimum value will be seen. In one embodiment a model may return a mean and variance, and this may be used to calculate the probability. A varance may be returned that may be used to create an interval within which most occurrences (e.g. 90% of the recorded occurrence) may fall.

A "threshold" parameter may define a threshold for a probability of improvement of the current loss curve, where if the probability of improvement is below the threshold stopping may occur. Other thresholds may be used, e.g. as in Tables 4 and 5, where a threshold may be a loss amount or range, where if the actual loss is within a threshold of predicted loss, stopping may occur. The threshold parameter may be used, for example, in:

Local Mode: Training is stopped when the predicted probability of improvement is lower than the threshold.

Global Mode: A counter (e.g. to be compared to a patience parameter) is incremented every time the predicted probability of improvement is less than the threshold.

A "patience" parameter may determine or define how many epochs or other units a process will wait for the validation loss of a particular NN model being trained to fall within a model's prediction, prediction interval or value. In some embodiments, in a "local" mode, evaluating a certain NN, patience may define the number of evaluations to wait without seeing any improvement in the loss curve, and may reset every time there is an improvement in the loss curve. If the actual or current NN validation loss is within the predicted interval at a certain period of time, a patience value or counter may reset whenever there is improvement over time in the loss. If the loss fails to improve, the patience value or parameter may be incremented, and training the model may be stopped once the patience value or parameter exceeds the patience parameter.

In some embodiments, in a "global" mode, evaluating a certain NN, patience may define the number of evaluations or epochs to wait where the probability of the loss curve improvement over the best seen so far with a NN having different hyperparameters is less than a threshold. In a 'local' mode, patience may define the number of evaluations where the predicted probability of improvement is less than the threshold.

Tables 1 and 2 are shown below:

TABLE 1

Algorithm 1 Early Stopping (Local)
Global Variables:
    wait, initialized to 0 // wait is a wait parameter to be incremented if no improvement
Input:
    loss_history = [$y_0, y_1, \ldots, y_{t-1}$] // Historical loss values for the NN to be analyzed for stopping training. Typically each y is collected at the end of each sequential epoch or other period of time, but other ways of organizing a series of loss data may be used. Data is for epochs or periods labelled starting at zero. In one embodiment normalization and conditioning are performed in the model used in PREDICT, shown in Table 3. loss_history excludes the current loss value $y_t$
    current = $y_t$ // the current loss value for the NN, e.g. value subsequent to $y_{t-1}$
    $\Phi$ = hyperparameters for the NN
    patience = Z>0 // threshold for wait
    threshold = R $\in$ [0, 1] // threshold for probability, range 0-1
Output:
    True/False // True tells calling procedure to stop training; False=keep training
1: procedure EARLY STOPPING (loss_history, current, $\Phi$, threshold, patience) // call procedure for local stopping with input
2: current_min = min(loss_history) // current_min is the lowest value in loss_history for NN
3: current_best = min(current, current_min) // minimum from loss history and current loss
4: prediction, interval, $prob_i$ = Predict(loss_history, $\Phi$, current_best) // Example of predict is described in Table 3; interval and prediction may not be used, but may be used in some embodiments
5: if current < current_min then // If there is improvement (current NN loss better than historic), reset the wait value
6:    wait = 0
7: else .// If no improvement is seen, increment the wait value
8:    wait = wait + 1
9: if $prob_i$ <= threshold then // If probability of improvement less than threshold, stop training;
10:    return True // True is a determination to stop training; signals the procedure calling EARLY STOPPING to stop training the NN TABLE 1-continued 11: if wait >= patience then // If the wait value is greater than or equal to patience value there has been no improvement over some time, so stop training
12:     return True
13: return False // signal to calling procedure to continue training NN; if any True condition is not met, return False; False is a determination to continue training;

TABLE 2

Algorithm 2 Early Stopping (Global)
Global Variables:
    wait = 0
Input:
    current_loss_history = $[y_0, y_1, \ldots, y_{t-1}]$
    best_metric = min([min(loss_history$_0$); min(loss_history$_1$); ... min(loss_history$_n$)]) //
    loss_history$_x$ is the loss history from NNx trained NNs having hyperparameters different from
    NN being trained currently; best_metric is lowest loss found among loss histories for all other
    NNs; alternately one "best seen so far" variable may be used
    patience = Z>0
    $\Phi$ = hyperparameters for the NN
    threshold = R $\in$ [0, 1] // threshold for probability, range 0-1
Output:
    True/False // True tells calling procedure to stop training; False=keep training
1:  procedure EARLY STOPPING(loss_history, current_loss_history, $\Phi$, start, interval, threshold, patience)
2:    prediction, interval, prob$_i$ = Predict(loss_history, $\Phi$, best_metric)
3:    if prob$_i$ <= threshold then // If the probability this NN will be trained to a loss better
than best seen with other NNs is less than a probability threshold, increase wait else if probability > threshold, return false below and continue training
4:        wait = wait + 1
5:    if wait >= patience then
6:        return True // Stop early; no probability seen over a certain period that this
NN will have better loss than others, thus stop training this NN; True is a determination to stop training
7:    return False // If the probability NN will be trained to a loss better than best seen with other NNs is greater than threshold, do not stop training; False is a determination not to stop training The example procedures shown in Tables 1 and 2 call or execute an example procedure such as shown in Table 3, to return a probability for improvement. The example procedures shown in Tables 1 and 2 may in turn be called or executed by a procedure choosing hyperparameters for a NN, or a procedure training a NN for which hyperparameters have been chosen. The functionality shown across the Tables in the present application may be organized differently, and for example do not need to be divided across modules as disclosed herein. Models such as $m_\mu$ and $m_\delta^2$ used in the algorithm in Table 3, or other models such as those used in Table 5, may accept a loss history and convert that history to features or other derived values, such as by using preprocessing and methods such as extracting features. Thus in some embodiments, a model may include code, or be in part an executable module, deriving the relevant features or values from a loss sequence.

TABLE 3

Algorithm 3 Predict
Input:
    current_loss_history = $[y_0, y_1, \ldots, y_{t-1}]$ // For NN being evaluated
    $\Phi$ = hyperparameters
    best_metric = R>0 // if "local" may be best loss seen for specific NN; if global may be best
    loss across other NNs trained, typically with different hyperparameters
Output:
    prediction = R>0 // predicted loss history, expressed as mean below
    interval = [R>0; R>0]
    prob$_i$ = R $\in$ [0, 1] // likelihood, between 0 and 1, that this NN's loss will ever be better than
    input best_metric
1: procedure PREDICT(loss_history, $\Phi$, best_metric)
2: origin = $y_0$ // origin, used to normalize or re-scale, is set to the first loss recorded for the NN
3: current_min = min(loss_history)
4: mean = origin × (1.0 − $m_\mu$ (loss_history, $\Phi$)) // input loss_history and hyperparameters to model
to receive from model mean, the un-normalized likely best loss predicted to be achieved for this NN
5: var = origin × ($m_\delta^2$ ((loss_history, $\Phi$)) // Input data to model to receive from model predicted variance TABLE 3-continued 6: std = square root of var
7: max = mean + 1.96 × std
8: min = mean − 1.96 × std
9: $prob_i = \Phi_{mean,std}$ (best_metric) // Probability of improvement from a normal CDF (cumulative distribution function) parameterized by the mean and standard deviation; $\Phi_{mean,std}$ is CDF, which expresses a probability distribution
10: return mean, [min, max], $prob_i$ // [min, max] is pair of values returned as interval Tables 4 and 5 depict an alternate embodiment of a set of procedures for early stopping. The example procedure shown in Table 4 may in turn be called or executed by a procedure training a NN for which hyperparameters have been chosen. Tables 4 and 5 are as follows:

TABLE 4

Global Variables:
    wait, initialized to 0 // wait is a wait parameter to be incremented if no improvement
Input:
    loss_history = $[y_0, y_1, \ldots, y_{t-1}]$ // historical loss values for the NN to be analyzed for stopping training typically at the end of each sequential epoch or other period of time, but other ways of organizing a series of loss data may be used; for epochs or periods labelled starting at zero
    current = $y_t$ // the current loss value for the NN, e.g. value subsequent to $y_{t-1}$
    $\Phi$ = hyperparameters for the NN
    patience = Z>0 // threshold for wait
    threshold = R ∈ [0, 1]
Output:
    True/False
1: procedure EARLY STOPPING (loss_history, current, $\Phi$, threshold, patience) // call procedure with input
2: current_min = min(loss_history) // current_min is the lowest value in loss_history for NN
3: current_best = min(current, current_min)
4: prediction, interval = Predict(loss_history, $\Phi$, threshold) // Predict described in Table 5; interval may not be used, but may be used in some embodiments, so may be returned
5: if current < current_min then // If there is improvement (current NN loss better than historic), reset the wait value
6:     wait = 0
7: else // If no improvement is seen, increment the wait value
8:     wait = wait + 1
9: if current_best <= prediction then // If the minimum is less than or equal to the predicted value, stop training; prediction is adjusted in Predict line 4 by threshold
10:     return True // True is a signal to the procedure calling EARLY STOPPING to stop training the NN
11: if wait >= patience then // If the wait value is greater than or equal to patience value, stop training
12:     return True // Stop training
13: return False // signal to calling procedure to continue training NN; if any True conditions not met, return false

TABLE 5

Parameters:
    Origin = $y_0$ // origin, used to normalize or re-scale, is set to the first loss recorded for the NN
Input:
    loss_history = $[y_0, y_1, \ldots, y_{t-1}]$
    $\Phi$ = hyperparameters for the NN
    threshold = R ∈ [0, 1] // range of 0-1
Output:
    Prediction = R>0
    interval = [R>0, R>0] // A range bounded by the highest and lowest X%, e.g. 5% of returned values
1: procedure PREDICT (loss_history, $\Phi$, threshold) // Algorithm called by EARLY STOPPING to return loss estimate and range
2: origin = $y_0$
3: mean = origin × (1.0 − $m_1^{t-1}$ (loss_history, $\Phi$) − threshold) // Adjust mean prediction based on provided threshold parameter; $m_1$ is model returning an estimated mean; note this example embodiment of a "Predict" operation performs calculations in percentage then converts to an actual loss by multiplying by origin; mean, min and max are on scale of 0-1
4: min = origin × (1.0 − $m_2^{t-1}$ (loss_history, $\Phi$)) // $m_2$ is model returning an upper or high bound for an estimated range TABLE 5-continued 5: max = origin × (1.0 − $m_3^{t-1}$ (loss_history, Φ)) // $m_3$ is model returning a lower bound for an estimated range
6: return min(mean,max), [min, max] // Ensures that the adjustment to the mean value does not exceed the upper limit of the interval In the two algorithms in Tables 4 and 5, used in a "local" mode, EARLY STOPPING (Table 4) may be used by a training process to determine when to stop training; a return value of true means stop training, and false means continue training. EARLY STOPPING may take as inputs the loss history and current loss for a NN, the hyperparameters for the NN, and parameters such as patience and a threshold. EARLY STOPPING may call Predict (Table 5) which may use the sets of models, e.g. $m_1$, $m_2$, and $m_3$ discussed elsewhere. A model may determine the number of loss values in a loss history and determine from this which epoch number to use and thus which specific model to use (e.g. $m_1^X$, $m_2^X$ and $m_3^X$ for epoch X). Input to a model or to a model process may determine which specific model to use: for example if input to a model describes X epochs, the model(s) for epoch X will be used (or epoch X-1 if numbering starting at 0 is used). A model may process loss history data (e.g. normalization, calculation of derivatives) before use. The output from a model may be created by finding the relevant leaf into which the NN is categorized and returning the average of the loss values for all NNs in that relevant leaf. For example, if $m_1$ is a model returning an estimated mean, m1 may pre-process an input loss history (e.g. normalize), determine hyperparameters for the pre-processed data (e.g. derivatives, curve analysis), find the leaf matching or including the range in which the hyperparameters exist, and return the mean of loss values at the relevant epoch for NNs in that leaf. Procedure PREDICT in Table 5 may return loss values or ranges which are normalized to the particular NN being analyzed.

Internal to Predict, the loss returned by the models $m_x$ may be expressed in percentages (e.g. 0-1) and normalized to loss values relevant to a particular NN by multiplying by the first loss value seen for that NN (e.g. "origin"). The use of the threshold in Predict modifies the mean prediction so that the threshold (e.g. the level of accuracy set as a parameter, predefined or set by a user) is taken into account when the mean is compared in EARLY STOPPING. For example, the threshold value may "push" the mean value. For example, if loss starts at 100, and a 97% improvement is expected based on a model, if a user sets a threshold at 5%, then stopping may occur at 92% loss improvement.

The algorithms in Table 4 and Table 5 maintain a range bounded by "max" or the value of $m_3$. However, in the embodiment shown in Table 4 and Table 5 the range, and min, are not used. In other embodiments, such a range, or min, may be used. For example, a returned min or range may be used to ensure a user's confidence in the process, or may be provided on a user interface.

In one embodiment, the loss values in a model are stored as a percentage, or a range from 0-1, and then may be converted to a real loss value when returned from the model. For example, this conversion may take place by multiplying the returned percentage by "origin", the first loss value received for a NN.

The input to the stopping process may include model parameters describing a particular NN at a particular point in time in training for that NN, e.g. during or after a particular epoch in training. Model parameters may include, for example, the loss history, a current loss for the NN (typically measured at the end of an epoch, but a different way of measuring current loss for a time-series item may be used), hyperparameters for or some other description of the NN, and possibly user variables such as patience or a threshold for waiting, and an accuracy threshold defining a range within which if the expected loss falls training can be stopped. In some embodiments a "loss history" may include a current loss, and thus a current loss need not be a separate data item.

Embodiments of the present invention may improve prior NN training by making training or learning more efficient, by stopping training at a point where little or no further improvement is expected, or less than a certain amount of improvement is expected. Embodiments of the present invention may improve and make more efficient prior NN hyperparameter selection by stopping training of a NN with a set of hyperparameters at a point where it is unlikely that the current NN can be trained to have a loss better than the best seen so far for other NNs. This may be compared with prior methods, which notice improvement training after-the fact: embodiments of the present invention may use past data to predict when such stagnation may occur, or to predict a best loss to be found in the future: for example embodiments of the invention may predict future improvement, or the odds of improving in the future. This may save resources such as compute or processor time. Embodiments may provide an improvement over prior art learning mechanisms in that specific aspects of a NN such as architecture and application are not considered, as certain embodiments may be applied across a range of NN types, applications and architectures. Embodiments of the present invention may deliver better predictions by returning (using an internal model) a predicted minimum, e.g. the best a NN is predicted to achieve, as opposed to a specific predicted value for a predicted specific time.

Embodiments were tested in a "global mode" of stopping while choosing hyperparameters by optimizing a 6-layer Convolutional Neural Network on the CIFAR10 dataset (a known dataset including thousands of color images in different classes), using an SMAC (sequential model-based algorithm configuration) optimizer. The SMAC optimizer was executed with and without an embodiment of an early stopping algorithm described herein. The total number of epochs required to achieve a comparable test set error was compared, and in one example a comparable error on the test set of CIFAR10 was achieved, using early stopping, in 300 fewer epochs than without.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of training a neural network (NN), the method comprising:
  over a series of NN training epochs, where in each epoch the NN undergoes training and a loss is computed:
    determining, using:
      a set of model parameters;
      data describing training loss of the NN; and
      a model that has been trained using training losses of a plurality of NNs other than the NN;
    a probability of improvement in the loss of the NN; and
    if the probability is less than a threshold, or a wait value is greater than a wait threshold, stopping training.

2. The method of claim 1, comprising if the probability is not less than a threshold and a wait value is greater than a wait threshold, continuing training.

3. The method of claim 1, comprising increasing the wait value if the current loss of the NN is not less than the minimum loss in the loss history for the NN.

4. The method of claim 1, comprising setting the wait value to zero if the current loss of the NN is less than or equal to the minimum loss in the loss history for the NN.

5. The method of claim 1, wherein determining using a model a probability of improvement in the loss of the NN comprises obtaining from a leaf of at least one tree data structure data relevant to the NN.

6. The method of claim 1, wherein determining an expected probability of improvement comprises determining a mean expected training loss and a variance.

7. The method of claim 1, wherein model parameters comprise hyperparameters.

8. A system of training a neural network (NN), the system comprising:
  a memory; and
  a processor configured to:
    over a series of NN training epochs, where in each epoch the NN undergoes training and a loss is computed:
      determine, using:
        a set of model parameters;
        data describing training loss of the NN; and
        a model that has been trained using training losses of a plurality of NNs other than the NN;
      a probability of improvement in the loss of the NN; and
      if the probability is less than a threshold, or a wait value is greater than a wait threshold, determine to stop training.

9. The system of claim 8, wherein the processor is configured to, if the probability is not less than a threshold and a wait value is greater than a wait threshold, determine to continue training.

10. The system of claim 8, wherein the processor is configured to increase the wait value if the current loss of the NN is not less than the minimum loss in the loss history for the NN.

11. The system of claim 8, wherein the processor is configured to set the wait value to zero if the current loss of the NN is less than or equal to the minimum loss in the loss history for the NN.

12. The system of claim 8, wherein determining using a model a probability of improvement in the loss of the NN comprises obtaining from a leaf of at least one tree data structure data relevant to the NN.

\* \* \* \* \*